United States Patent [19]

Unigovsky et al.

[11] 4,231,694
[45] Nov. 4, 1980

[54] APPARATUS FOR REMOVING A WELDING BULGE FROM PIPES

[76] Inventors: Mikhail R. Unigovsky, ulitsa Pushkinskaya, 21, kv. 33; Evgeny V. Rulevsky, ulitsa Vyshgorodskaya, 30, kv. 64; Fedor I. Sapa, ulitsa Kondratjuka, 2a, kv. 66; Alexei T. Parkhomchuk, ulitsa Kopylovskaya, 21, kv. 87; Arnold S. Yampolsky, ulitsa Kopylovskaya, 21, kv. 80; Veniamin S. Rotenfeld, ulitsa Sholom-Aleikhema, 1, kv. 17, all of Kiev; Vasily T. Ivanov, Borispol, ulitsa Shevchenko, 5, kv. 4, Kievskaya oblast; Isaak Y. Nemirovsky, ulitsa Kopylovskaya, 21, kv. 67, Kiev; Viktor M. Kovalenko, Boyarka, ulitsa Zhdanova, 65, kv. 52, Kievskaya oblast; Nikolai S. Vnuchenko, Borispol, ulitsa Tsentralnaya, 6, kv. 35, Kievskaya oblast, all of U.S.S.R.

[21] Appl. No.: 29,323

[22] Filed: Apr. 12, 1979

[30] Foreign Application Priority Data

May 22, 1978 [SU] U.S.S.R. .............................. 2618997

[51] Int. Cl.³ .............................................. B23C 1/20
[52] U.S. Cl. .................................. 409/179; 409/139; 409/140; 409/199
[58] Field of Search ............... 409/139, 179, 199, 138, 409/140, 178; 82/4 C; 51/125

[56] References Cited

U.S. PATENT DOCUMENTS

| 2,842,238 | 7/1958 | Shaw et al. | 409/179 |
| 2,917,976 | 12/1959 | Stovall et al. | 409/179 |
| 3,010,352 | 11/1961 | Dunlap | 409/138 X |
| 3,688,615 | 9/1972 | Protze et al. | 409/178 X |
| 3,699,828 | 10/1972 | Piatek et al. | 409/178 X |
| 3,842,713 | 10/1974 | Hamilton | 409/199 |

FOREIGN PATENT DOCUMENTS

| 7703671 | 4/1977 | Netherlands | 409/179 |
| 546438 | 2/1977 | U.S.S.R. | 409/179 |
| 578164 | 10/1977 | U.S.S.R. | 409/140 |

*Primary Examiner*—William R. Briggs
*Attorney, Agent, or Firm*—Lackenbach, Lilling & Siegel

[57] ABSTRACT

A welding bulge removing apparatus comprises a U-shaped carrier adapted to be placed by means of rollers on welded pipes at the weld bulge, and being provided with an arcuate guideway and a toothed segment. It also comprises a motor-operated carriage having a driving gear wheel and support rollers. Mounted on the carrier are cutting tool holders movable to and from the weld bulge. The gear wheel and the support rollers of the carriage are respectively brought into engagement with the toothed segment and the arcuate guide-way of the carrier. The carriage is adapted to be rigidly connected to a lifting mechanism of a vehicle used for raising and carrying the welding bulge removing apparatus, whereby rotation of the carrier is effected, while the carriage remains immobilized.

2 Claims, 1 Drawing Figure

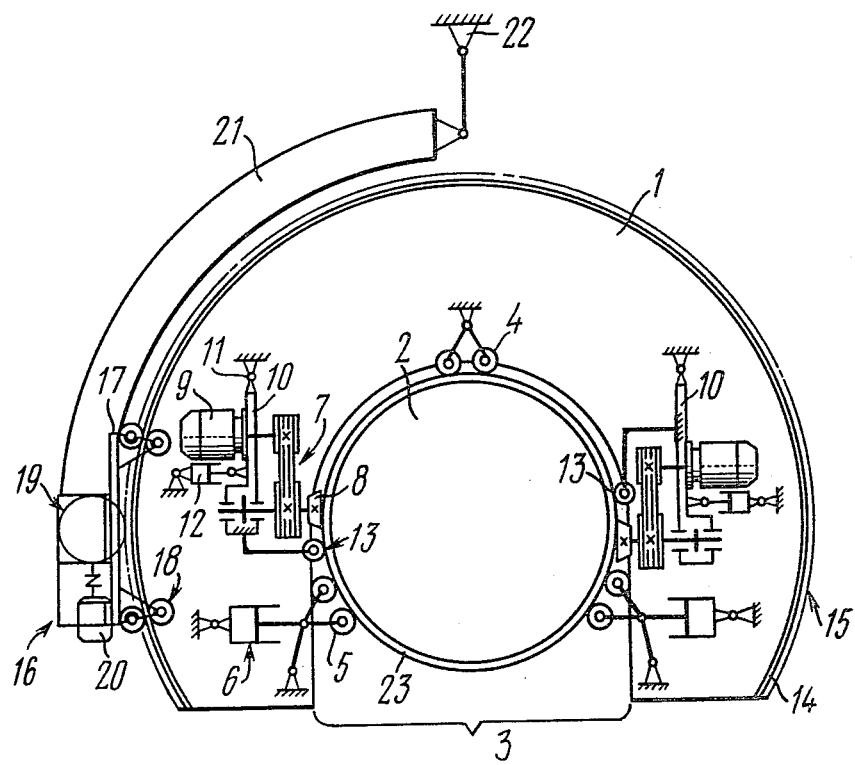

APPARATUS FOR REMOVING A WELDING BULGE FROM PIPES

BACKGROUND OF THE INVENTION

The present invention is related to an apparatus for removing a welding bulge, and in particular, to an apparatus for removing a welding bulge from resistance welded pipes while laying pipelines.

Variously constructed and modified apparatus for removing a welding bulge, intended for operation in specific conditions, are well known in the art.

The invention is directed to an apparatus designed for field operation while laying pipelines for the long-distance transporation of petroleum and gas. More specifically, the present invention deals with the apparatus designed for removing a welding bulge from resistance welded pipes under the aforesaid conditions.

Apparatus thus far proposed, as exemplified in USSR Inventor's Certificate Nos. 507373, 468729, 468730, generally comprise impact or cutting tools, motion and static parts, and mechanisms for driving the tools.

Such apparatus, particularly those intended for large-diameter (over 1,000 mm) pipes, are of large dimensions and heavy weight, and therefore present problems in service and are greatly time-consuming for setup under field conditions in pipeline construction. As a consequence, their performance has proved to be lower than that of the electric resistance welding machines, which machines together with the apparatus in question forming part of a single production complex.

Known in the prior art is an apparatus for removing a welding bulge from resistance welded pipes as disclosed in USSR Inventor's Certificate No. 589090. This apparatus comprises a U-shaped carrier adapted to be placed at the bulge zone in spaced circumferential relationship to the welded pipes and it is provided with centering rollers, at least two of which are radially movable with respect to the center of the welded pipes circumference and are generally disposed on the end portions of the carrier, and cutting tool holders disposed on the carrier provide movement to and from the weld bulge.

The radially movable centering rollers are motor-operated, whereby the carrier will be turned about the pipes at the weld bulge zone.

In operation, the motor-operated centering rollers by rolling over the pipes impart rotary motion to the carrier. As this takes place, the holders will perform the approach of the cutting tools to the weld bulge and the carrier will provide the feed of this tool.

Though simple in construction, this apparatus will suffers from a number of disadvantages.

Inasmuch as the motor-operated centering rollers of the known apparatus are supported upon the welded pipes, the reliability of the drive for feeding cutting tools is completely dependent on the engagement of the motor-operated rollers with the surface of the pipe, providing the drive power is sufficient to defeat resistance to the cutting tools.

The reliability of the roller-pipe engagement is in turn dependent on the surface condition of the pipes and the rollers, since under field conditions there may be ice formation, oil film, and other friction-affecting deposition formations which can affect the friction between the contacting parts. This brings about vibration in the tools and a drop in the speed of feeding thereof, which in turn impairs performance of the prior art apparatus.

The problem of performance is even more acute in view of the fact that the welding bulge has to be removed in more than one pass.

SUMMARY OF THE INVENTION

An object of the present invention is to provide an apparatus for removing a welding bulge from resistance welded pipes, which is of a simple construction.

One more object of the present invention is to provide an apparatus of the kind specified, which exhibits a higher performance as compared to that of the apparatus of a similar design.

A further object of the invention is to provide a more reliable apparatus for removing a welding bulge.

These and other objects of the invention, will become clear from the following detailed description of an embodiment of the invention, when taken in conjunction with the accompanying drawing, wherein an apparatus for removing a welding bulge from resistance welded pipes comprises a motor-operated carriage adapted to be rigidly connected to a lifting mechanism of a vehicle used for raising and carrying the apparatus. The carriage includes support rollers and a driving gear wheel. The apparatus further includes a U-shaped carrier having an arcuate guideway and a toothed segment both adjacent the outer periphery of said carrier and extending the length thereof, and they are brought into engagement with the support rollers and the driving gear wheel of the motor-operated carriage respectively. In operation, this arrangement provides for rotation of the carrier, while the carriage remains immobilized.

The apparatus of the invention, being specifically adapted for an in-the-field operation while laying pipelines, provides for the required performance and reliability as well as a higher quality surface after bulge removal. In the course of test runs of the apparatus about 2000 butt welds between pipes of a large diameter (1420 mm) were machined, the performance being 5 to 6 butt welds per hour.

BRIEF DESCRIPTION OF THE DRAWING

The nature and principles of the present invention will be understood by reference to the accompanying sole FIGURE of the drawing which shows diagrammatically an apparatus of the invention as viewed along the axis of the welded pipes.

DESCRIPTION OF THE PREFERRED EMBODIMENTS

Referring to the drawing, the apparatus for removing a welding bulge from resistance welded pipes comprises a U-shaped carrier 1 adapted to be placed at the weld zone in spaced circumferential relationship to the welded pipes. The carrier is preferably of a disk-like shape having a central opening 2 of a diameter, which complies with the above condition, and a slot 3 as wide as the diameter of the central opening so that the carrier 1 takes the form of a U with end portions separated by a spacing or the slot 3 to pass the welded pipes therebetween in placing the carrier 1 into position.

The carrier 1 is provided with centering rollers which are arranged adjacent the periphery of the central opening 2 of the carrier 1 or the inner periphery of the same carrier. The centering rollers are mounted in pairs, of which rollers those designated by the reference numeral 4 are made stationary with respect to the carrier 1 and are disposed on the middle portion of the